United States Patent [19]
Ensch et al.

[11] Patent Number: 5,860,511
[45] Date of Patent: Jan. 19, 1999

[54] CONVEYOR GUIDE RAIL SUPPORTS

[75] Inventors: Peter J. Ensch, Wauwatosa; Dennis A. Woyach; Robert E. Mitchell, both of Milwaukee, all of Wis.

[73] Assignee: Rexnord Corporation, Milwaukee, Wis.

[21] Appl. No.: 749,909

[22] Filed: Nov. 15, 1996

[51] Int. Cl.[6] .................................................. B65G 21/20
[52] U.S. Cl. ......................................................... 198/836.3
[58] Field of Search ............................. 198/836.3, 836.1

[56]  References Cited

U.S. PATENT DOCUMENTS

| | | | |
|---|---|---|---|
| 2,870,740 | 1/1959 | Vogt ............................................. | 120/1 |
| 3,776,350 | 12/1973 | Tice ........................................... | 198/204 |
| 4,225,035 | 9/1980 | Mohney et al. ....................... | 198/836.3 |
| 4,470,499 | 9/1984 | Sijbrandij ............................. | 198/836.3 |
| 4,934,516 | 6/1990 | Dugan .................................... | 198/836.4 |
| 4,958,725 | 9/1990 | Meade et al. ........................ | 198/836.1 |
| 5,123,770 | 6/1992 | Trenner ................................. | 403/338 |
| 5,291,988 | 3/1994 | Leonard ............................... | 198/836.3 |
| 5,335,782 | 8/1994 | Herzog .................................. | 198/836.3 |
| 5,492,218 | 2/1996 | Falkowski ............................ | 198/836.3 |
| 5,498,098 | 3/1996 | Cairns .................................... | 403/400 |
| 5,501,544 | 3/1996 | Cairns .................................... | 403/400 |
| 5,533,826 | 7/1996 | Cairns .................................... | 198/836.3 |
| 5,626,221 | 5/1997 | Ledingham ......................... | 198/836.3 |
| 5,682,976 | 11/1997 | Jorgensen ............................ | 198/836.3 |
| 5,692,596 | 12/1997 | Ledingham ......................... | 198/836.3 |
| 5,701,991 | 12/1997 | Helmetsie ............................ | 198/836.3 |

FOREIGN PATENT DOCUMENTS

| | | | |
|---|---|---|---|
| 2710683 | 9/1978 | Germany ............................. | 198/836.3 |
| 2101194 | 7/1981 | United Kingdom . | |

OTHER PUBLICATIONS

Valu Guide Brochure (1987).
Feb. 1995 *Marbett S.p.A. Catalog*, pp. 81–98.
Jan. 1993 Rev. Aug. 1993 *ValuGuide Catalog*, Nos. 000029–000049.

*Primary Examiner*—Karen M. Young
*Assistant Examiner*—Douglas Hess
*Attorney, Agent, or Firm*—Michael Best & Friedrich

[57]  ABSTRACT

A guide rail support assembly for use with a conveyor having a transport chain or belt for transporting articles from one location to another. The guide rail support comprises the combination of guide rail holding assembly for holding a guide rail adjacent the transporter of a conveyor, a support assembly for supporting the guide rail holding assembly, and cam lever mounted on the support and having a first position for securing the holding assembly against movement relative to the support and a second position for releasing the holding assembly for movement relative to the support whereby movement of the cam lever between its first and second positions permits rapid repositioning of the guide rail relative to the transport chain of a conveyor without the use of tools.

16 Claims, 6 Drawing Sheets

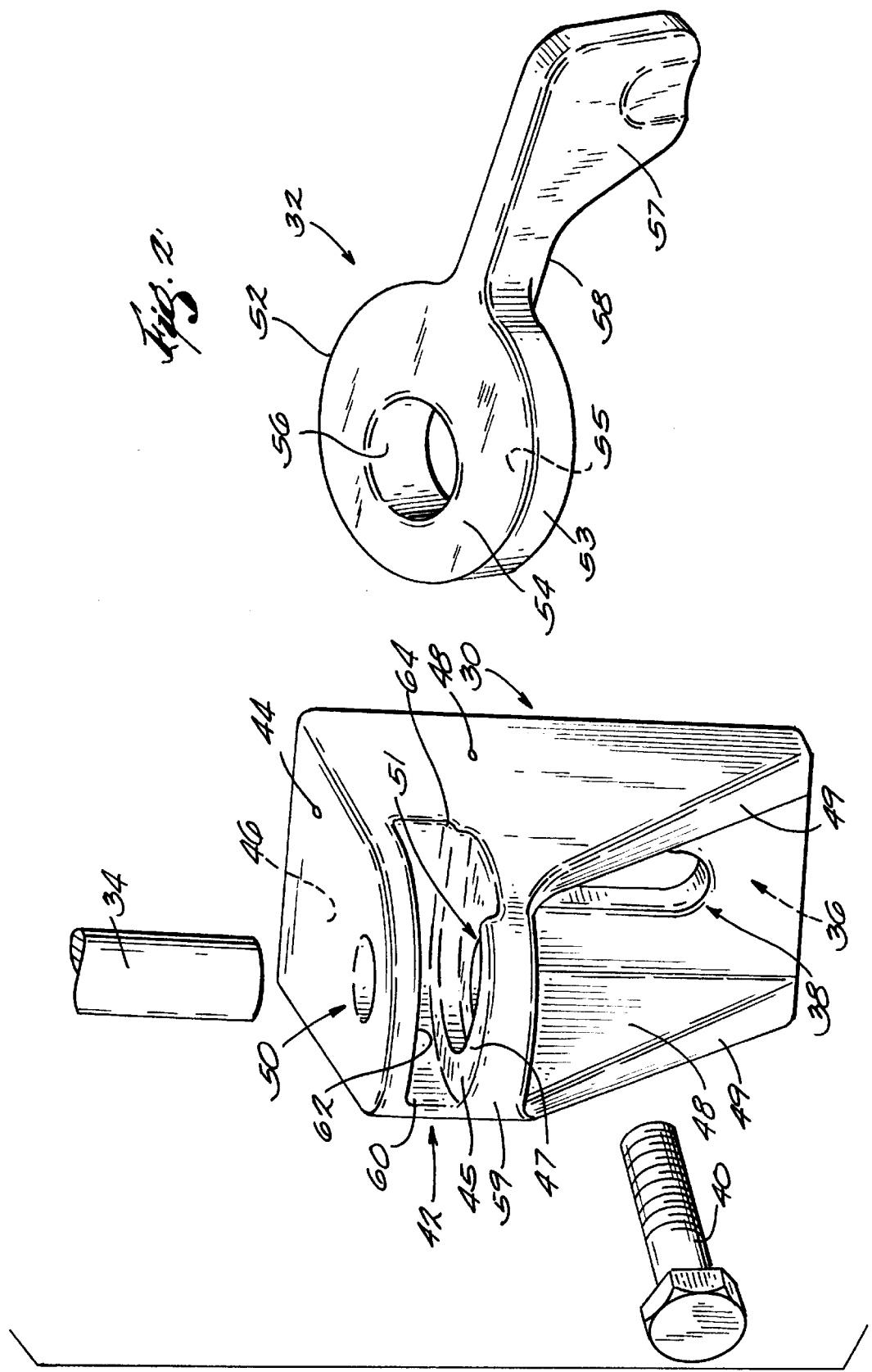

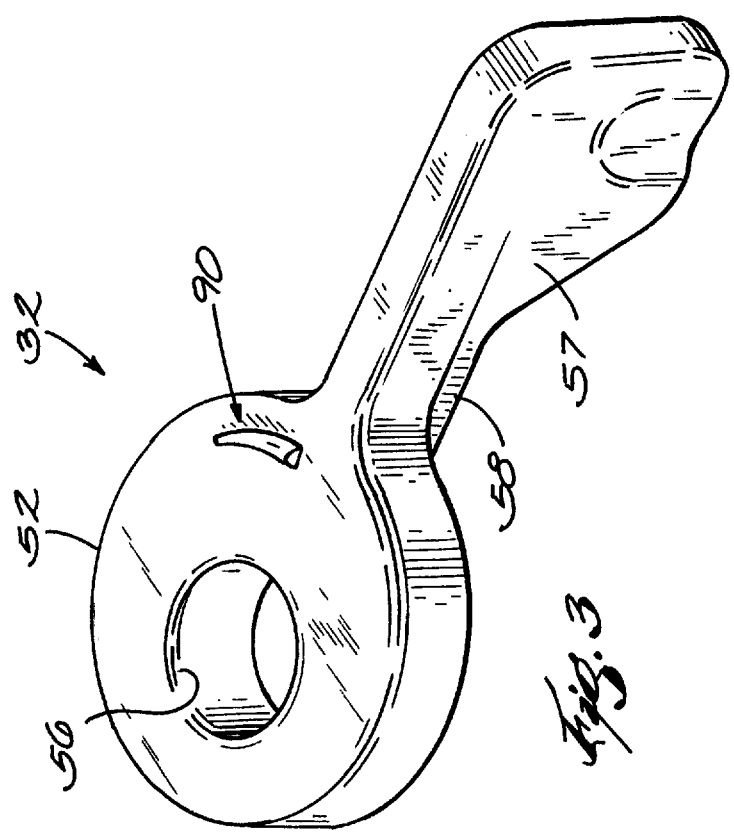

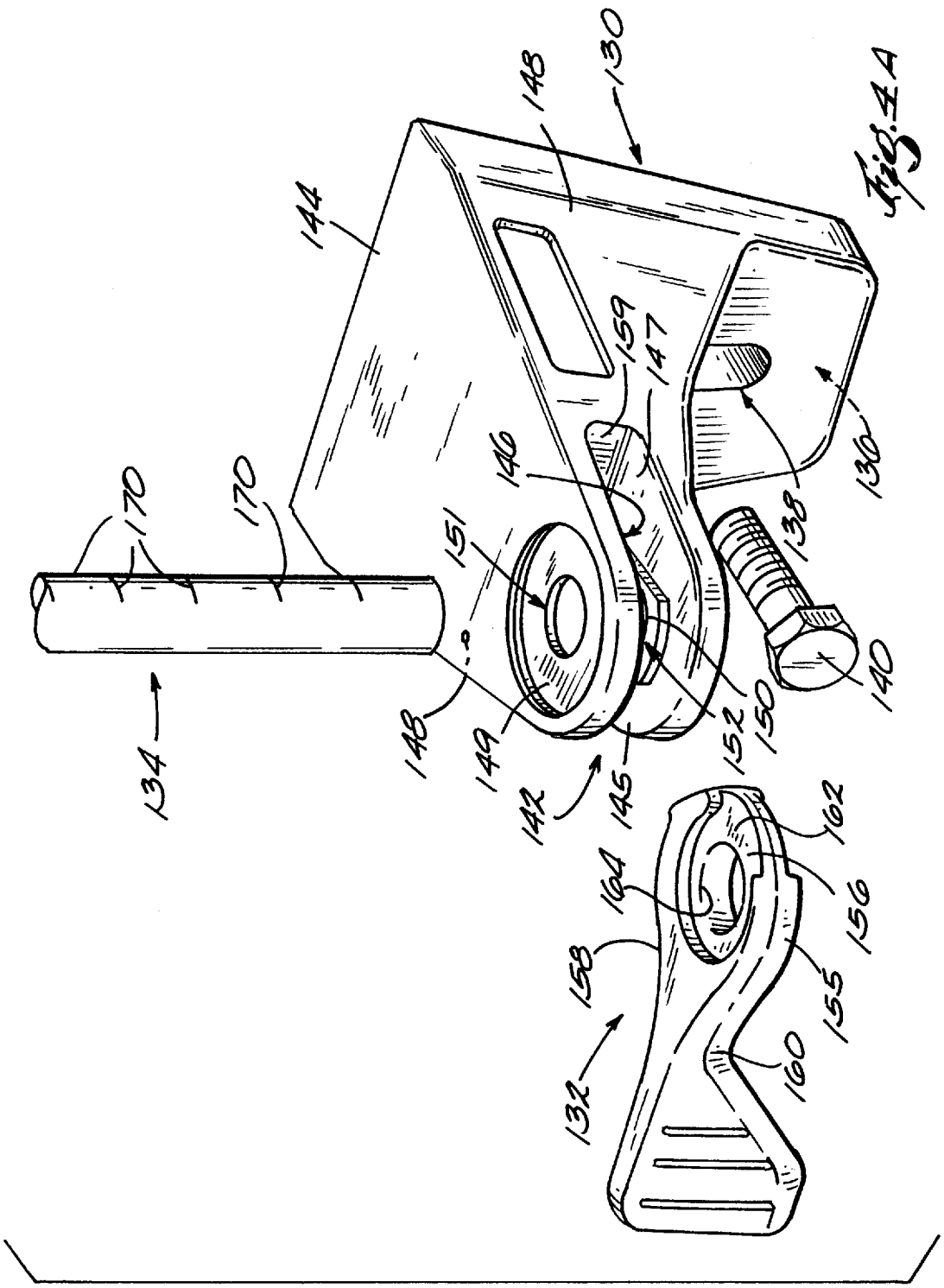

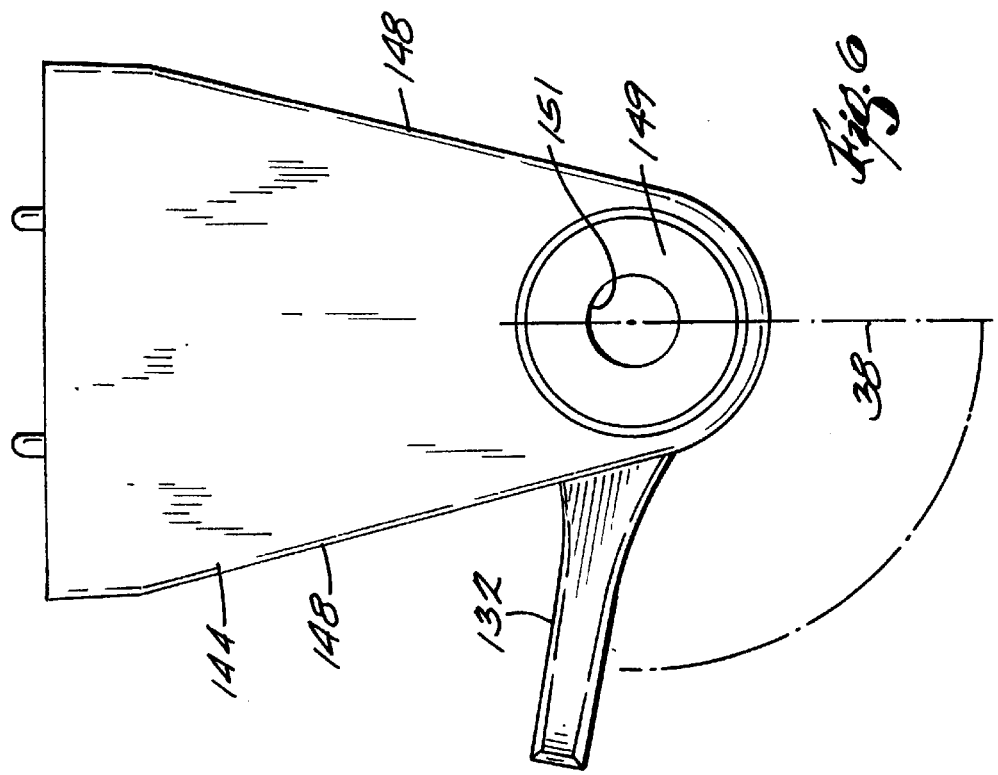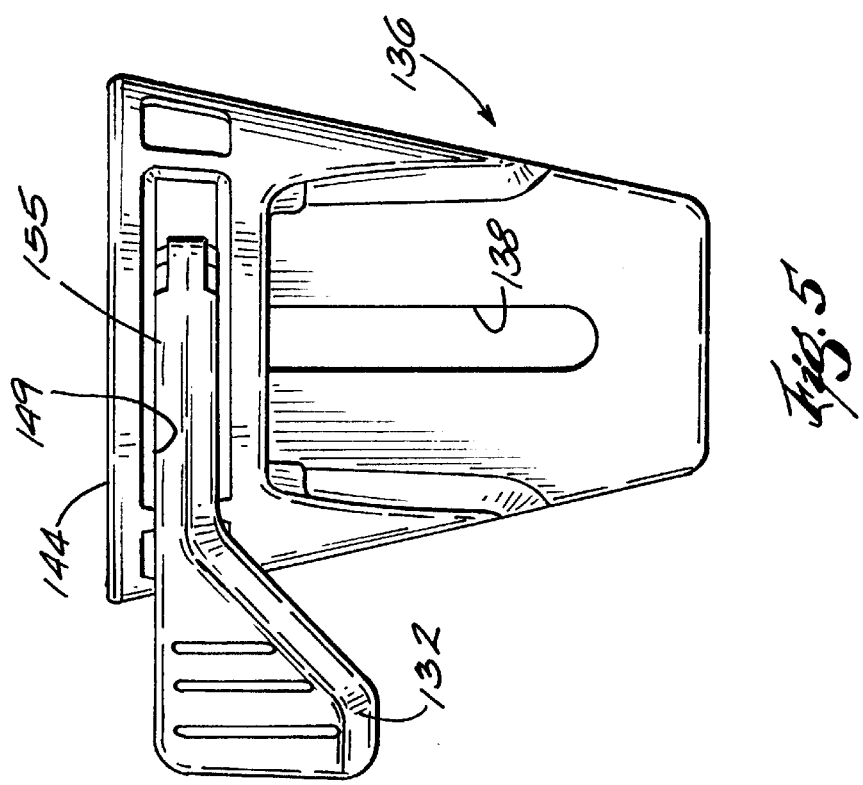

CONVEYOR GUIDE RAIL SUPPORTS

BACKGROUND OF THE INVENTION

This invention relates to conveying machines and more particularly to conveying machine guide rail supports.

Conveying machines, and particularly those employed for transporting food containers such as bottles and cans, generally include a moving belt or chain on which the containers are transported from one location to another. Guide rails are positioned along the sides of the moving belt to keep the containers from falling off the sides of the conveyor as they are transported. As the containers move along the conveyor, a substantial sidewise force is exerted against the guide rails resulting in an equal and opposite reaction force on the container. Accordingly, it is desirable that the guide rails be positioned at an optimum height relative to the container so that the containers remain upright as they are conveyed. Moreover, in the case of relatively taller containers, two or more guide rails are commonly employed. In addition, for bottles having a reduced diameter neck, specially configured guide rails are often employed above and generally inboard of the guide rails which engage the body of the container. The position of the guide rails may also be determined by the location of paper labels on the container.

If a conveyor is switched from one type of container to another having a different size or shape, it is often necessary to reposition the guide rails. Conventional guide rail supports generally include threaded fasteners for securing the guide rail clamps to the supports mounted on the conveying machine. As a result, these fasteners must be loosened and retightened when it is necessary to reposition the guide rails. This is a time consuming and labor intensive procedure since a large number of such brackets must be repositioned on conveying machines which are commonly several hundred feet in length.

It is an object of the invention to provide a new and improved support for conveying machine guide rails.

Another object of the invention is to provide a conveying machine guide rail support which permits the rapid and accurate repositioning of the guide rails without the use of tools.

These and other objects and advantages of the invention will become more apparent from the detailed description thereof taken with the accompanying drawings.

In general terms, the invention comprises a guide rail support assembly for use with a conveyor having transport means for transporting articles from one location to another. The guide rail support comprises the combination of guide rail holding means for holding a guide rail adjacent the transport means of a conveyor, support means for supporting the guide rail holding means and clamping means mounted on one of the holding means and the support means and having a first position for securing the holding means against movement relative to the support means and a second position in which the holding means is free for movement relative to the support means whereby movement of the clamping means between its first and second positions permits rapid repositioning of the guide rail relative to the transport means of a conveyor without the use of tools.

BRIEF DESCRIPTION OF THE DRAWINGS

FIG. 2 is an exploded prospective view of the guide rail support shown in FIG. 1;

FIG. 3 is a prospective view of a portion of an first alternate embodiment of the invention;

FIGS. 4A and 4B are prospective views of a second alternate embodiment of the invention;

FIG. 5 is a front view of the guide rail support shown in FIGS. 4A and 4B; and

FIG. 6 is a top view thereof.

DETAILED DESCRIPTION OF THE PREFERRED EMBODIMENT

Figure 1:
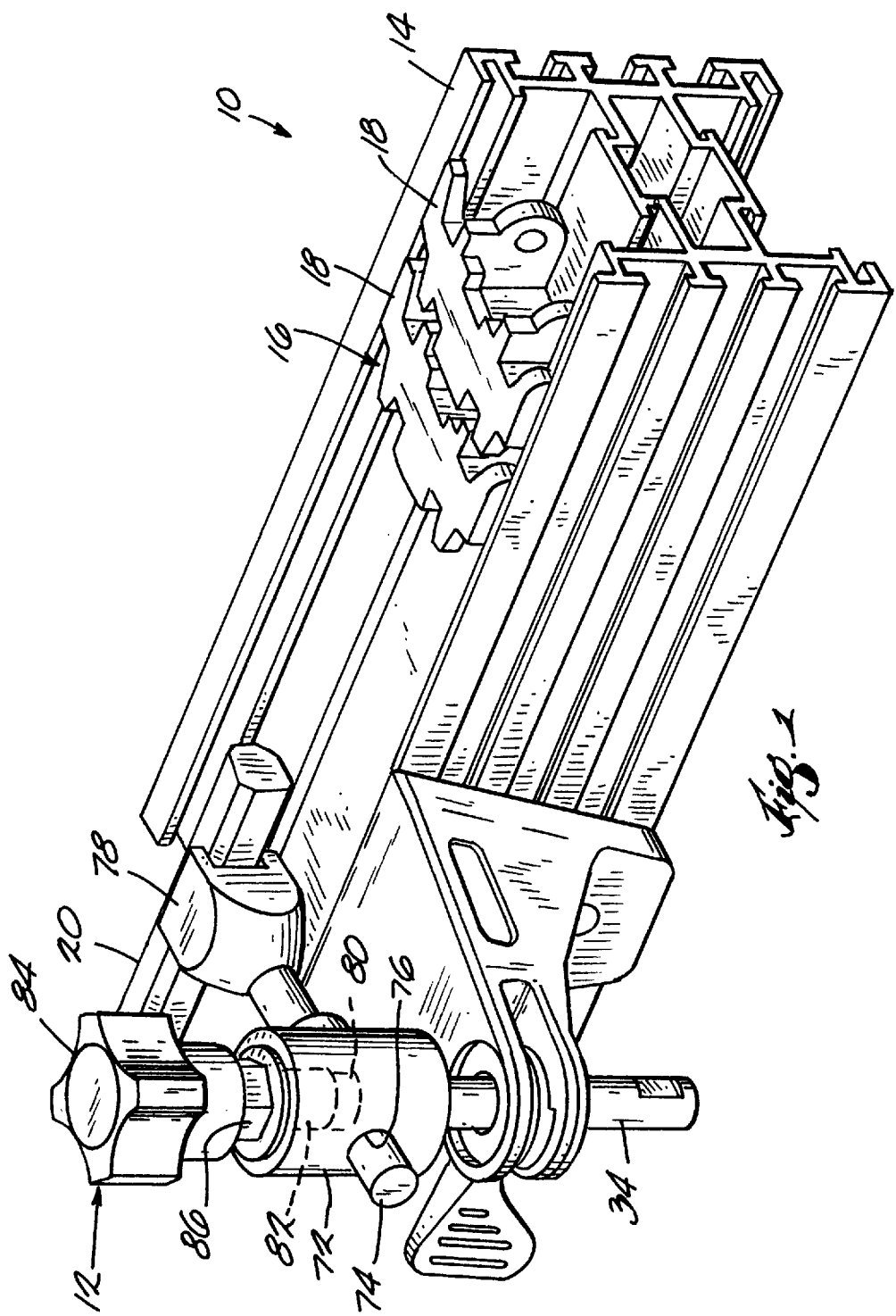
FIG. 1 is a prospective view of a conveyor incorporating a guide rail support according to the invention.

FIG. 1 shows a portion of a conveyor assembly 10 incorporating a guide rail support 12 in accordance with the preferred embodiment of the invention. The conveyor 10 includes a frame assembly 14 for supporting a conveyor belt or chain 16 upon which the products being conveyed are carried. While any suitable belt or chain may be employed, in the illustrated example, the chain 16 has a plurality of links 18, only two of which are shown, although those skilled in the art will appreciate that a plurality of such links are formed into an endless chain. The links are coupled to each other at their opposite ends by hinge pins (not shown). The chain 16 is moved over the guide rail support 12 by a drive chain and sprockets coupled to a power source (not shown). While only a single guide rail support is shown, it will be appreciated a plurality of spaced apart guide rail supports 12 position guide rails 20 adjacent to and on the opposite sides of the chain 16 to prevent the products being conveyed from falling off of the conveyor 10. The illustrated conveyor assembly 10 is intended as an example only, it being understood that the invention may be employed with other types of conveyors as well. Because the conveyor frame assembly 14, the chain 18 and the chain drive are conventional, they will not be described in greater detail for the sake of brevity.

A first embodiment of the guide rail support assembly 12 is shown in FIG. 2 to include a bracket member 30, a cam lever 32, and a rod 34 which carries a guide rail bracket assembly 36 at its upper end and which in turn supports the guide rail 20. The bracket member 30 and the cam lever 32 releasably secure the rod 34 against vertical movement.

The bracket 30 includes a backing plate 36 which has an elongate, vertically extending slot 38 so that the bracket 30 may be secured to the frame assembly 14 in any suitable manner such as by means of a bolt 40. A yoke 42 is disposed at the upper end of the backing plate 36 and comprises a top plate 44 and a bottom plate 45 which respectively define parallel spaced apart surfaces 46 and 47. Side plates 48 and gussets 49 support the yoke 42 on the backing plate 36. Aligned holes 50 and 51 are formed in the yoke plates 44 and 45, respectively, for receiving the rod 34.

Figure 4B:
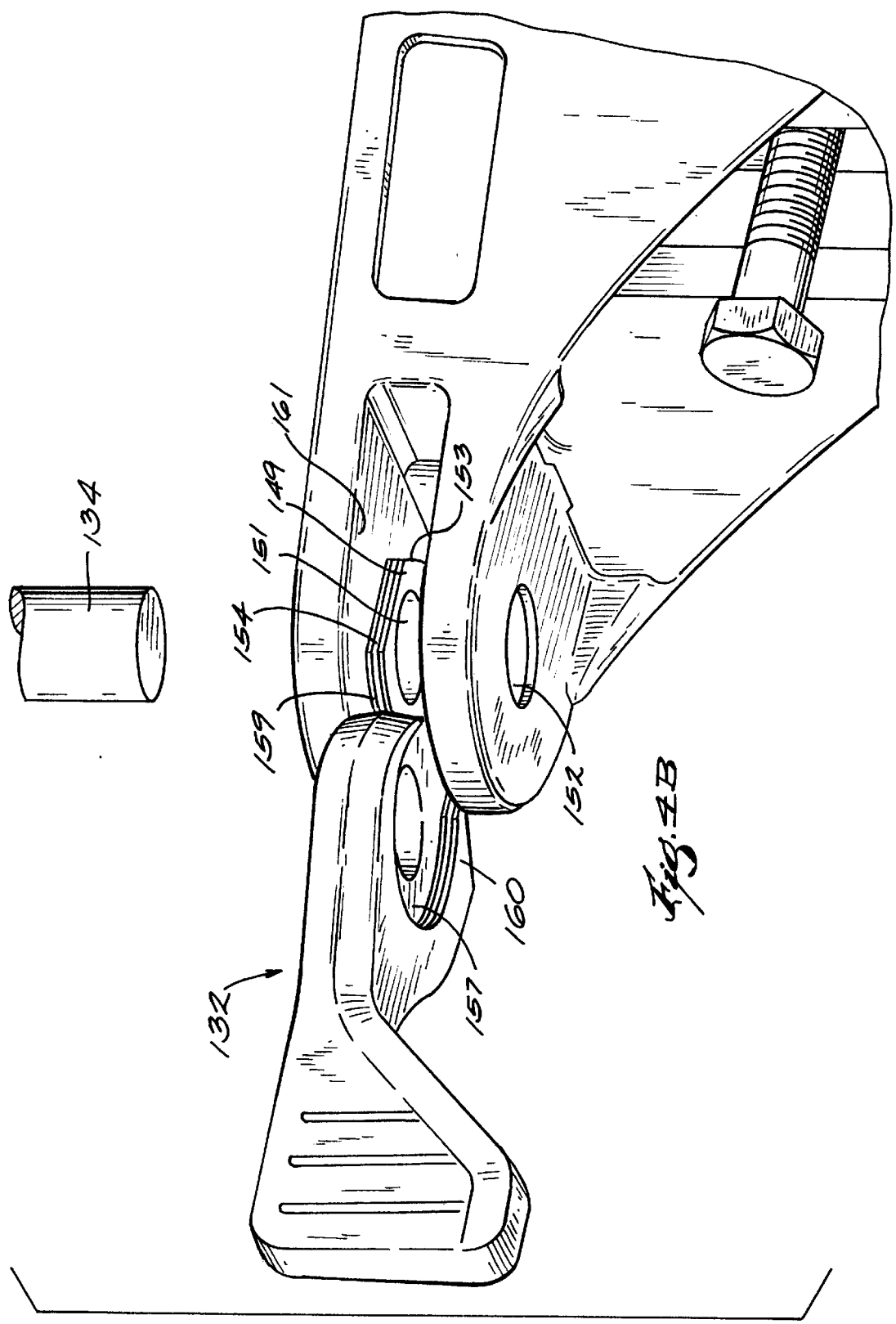

The cam lever 32 includes a round section 52 defined by an annular outer periphery 53 and opposed, parallel surfaces 54 and 55 which are spaced such that the round section 52 fits loosely between the surfaces 46 and 47 of the yoke 42. In addition, a hole 56 is formed eccentrically through the round section and is sized to slidably receive the rod 34. A handle 57 extends integrally from one side of the round section 52 and has a neck portion 58 which widens from the round section 52 outwardly. The center of the hole 56 is displaced from the center of the round section 52 and toward the side thereof opposite the handle 57. An arcuate front wall 59 is provided on the yoke 42 and between the plates 44 and 45. The radius of the arc which is defined by the front wall 59 is slightly larger than that of the round section 52 of cam lever 32. The side plates 45 extend tangentially outwardly from the front wall 59 as seen in FIGS. 4A and 4B. There is also a circular inner wall 60 which extends from between from the sidewalls 48 and defines a cavity 61 with the front wall 59 and the surfaces 46 and 47. The space between the surfaces 46 and 47 defines the thickness of the cavity 61, and the radii of curvature of the front and rear walls 59 and 60 are such that the round section 52 of the cam lever 30 is loosely received in the cavity 61.

A slot 62 is formed in the front wall 59 so that when the round section 52 of cam lever 32 is in cavity 61 the handle 57 extends outwardly. The width of the slot 62 is slightly larger than the neck portion 58 of the handle adjacent the round section 52 so that the cam lever is restrained against tilting in the cavity 61. At one side of the slot 62 is a portion 64 of increased width so that when the cam lever 32 is positioned with the handle in the increased width portion 64, the lever is moveable inwardly relative to the cavity 61.

Reference is again made to FIG. 1 which shows the guide rail support 12 to also include means for supporting the guide rail 20 on the rod 34 and which permits the rail 20 to be positioned adjacent the conveyor chain 16. In the illustrated embodiment the guide rail support means includes a cross clamp mounted at the upper end of rod 34. Cross clamp is conventional and will not be described in detail for the sake of brevity. It will be sufficient for purposes of understanding the invention to state that the cross clamp includes a cylindrical body portion 72 secured to the upper end of rod 34. A second rod 74 is disposed in a cross hole 76 formed in body portion 72 and has a clamp 78 at one end for supportingly engaging the guide rail 20. The upper end of the body portion 72 has an axial threaded bore 80 which intersects the cross hole 76. A threaded locking member 82 is threadably received within the bore 80 for locking engagement with the rod 74. A knob 84 is fixed to the upper end of the locking member 82 for rotating the member 82 into and out of locking engagement with the rod 74. In addition, a nut 86 fixed to the knob 84 is provided for tightening and loosening the locking member 82.

When the cam lever 32 is positioned so that the handle 57 is located within the wide portion 64 of the slot 62, the hole 56 in the cam lever 32 can be aligned with the holes 50 and 51 in the plates 44 and 45, respectively. This permits the pin 34 and guide rail 20 to be moved vertically. When the guide rail 20 is positioned at the appropriate height relative to the products being conveyed, the cam lever 32 is rotated clockwise as viewed in FIGS. 1 and 4 which moves the handle to the narrower portion of the slot 60. As the handle moves from the concentric portion of the slot 60 into the tangential portion, the round section 32 is forced to rotate substantially about its geometric center by the configuration of the cavity 61 so that the hole 56 is moved out of alignment with the holes 50 and 51 in the yoke 44. This forces the margin of the hole 56 against one side of the rod 34 and the opposite side of the rod into engagement with the periphery of the holes 48 and 50. This jams the rod 34 in place.

FIG. 3 shows an alternate embodiment of the invention wherein the cam lever 32 also includes a second vertical cam 90 formed on the upper surface 92 of the round portion 52. The second cam 90 is positioned to one side of the junction between the round portion 52 and the lever 57 and is generally wedge-shaped and slightly arcuate. The inclined surface 94 of the cam 90 and the hole 56 are positioned relative to one another so as to work in combination. As the cam lever 32 is rotated, the eccentric hole 56 begins to grab onto the rod. Upon further rotation of the cam lever 32, the second cam 90 begins to take affect. The cam 90 is positioned relative to the eccentric hole 54 such that the first cam action applies a small force to the rod which is insufficient to lock the rod in place. The second cam begins to act on the rod 34 in the vertical or axial direction thus using the normal force of the first cam action to deliver a second force to the rod in the axial direction. As the cam lever 32 is fully rotated, the first cam action becomes dominant due to geometry and locks the rod into position.

FIGS. 4A, 4B, 5 and 6 show a second alternate embodiment of the invention to include a bracket 130 and a cam lever 132. The bracket 130 includes a backing plate 136 securable to a conveying machine by a bolt 140 extending through a slot 138. A yoke 142 is disposed at the upper end of plate 136 and includes top plate 144 and bottom plate 145 which respectively define spaced surfaces 146 and 147. The yoke is supported by side plates 148. Bosses 149 and 150 are formed, respectively, in the top and bottom plates 144 and 145, respectively, and each extends inwardly toward the cavity 161. The bosses 149 and 150 have aligned central holes 151 and 152, respectively, and each has arcuate forward and rear ends 159 and 153 and parallel sides 154.

The cam lever 132 includes a round section 155 having recesses 156 and 157 formed respectively in its upper and lower surfaces 158 and 160. The recesses 156 and 157 are generally circular and have a gap at their forward ends 162 for receiving the bosses 149 and 150. In addition, the diameter of the recesses 156 and 157 is slightly larger that the distance between the arcuate ends 152 and 153 of bosses 149 and 150 and the width of the gaps 162 is slightly larger than the distance between the sides 154 of the bosses. This permits the cam lever to be inserted between the bosses 149 and 150 and rotated to its position shown in FIG. 6.

The cam lever 132 also includes an eccentric opening 164 offset relative the pivot axis of lever 132 on the side opposite the handle 166 in the same manner as in the embodiment of FIG. 2.

When the handle 132 is positioned with its center line along line 168 of FIG. 6 allows the lever to be moved relative to the yoke 142 so the hole 164 may be positioned coaxially relative to the holes 151 and 152 whereby rod 34 can be moved vertically.

Rotation of the lever 132 clockwise as shown in FIG. 6 moves the hole 164 in cam lever 132 out of alignment with holes 151 and 152 so that the rod 34 is locked in position.

The system according to the invention locks the rod in position without the use of standard threaded fasteners requiring tools to move, adjust or unlock the rod 34. In addition, the bracket can apply a vertical load to pretension the rod when a rod having a wedge or lip is used.

The cam levers 32 and 132 are preferably formed of a hard plastic material. This allows the eccentric hole to deform when locking the rod 34. If the rod 34 is threaded, the eccentric holes 56 and self threads when tightened thus increasing the holding force of the cam lever on the rod and permits the transfer of axial forces on the rod by engagement of the second cam 90. The cam's natural rotation in the clockwise direction as shown in FIG. 2 acts to help apply an axial load to a threaded rod 34. Upon full rotation of the cam, the first cam action becomes dominant thus locking the threaded rod into position with pretension. This is accomplished without the requirement for tools.

FIG. 4A also shows a further feature of the invention wherein the rod 134 includes position marker 170 spaced along the rod 134. These permit the operator to position the guide rail 20 for different sized containers being conveyed without the requirement for any additional measuring devices.

While only a few embodiments of the invention are shown and described, the scope of the invention is not intended to be limited by the specific embodiments shown, but only by the scope of the appended claims.

We claim:

1. A guide rail support for use with a conveyor having transport means for transporting articles from one location to another, said guide rail support comprising:

guide rail holding means for holding a guide rail adjacent the transport means;

support means for supporting said guide rail holding means, one of said guide rail holding means and said support means including an elongated member having a longitudinal axis, said support means being constructed and arranged to be mounted on the conveyor and adjacent the transport means; and clamping means at least partially surrounding said elongated member, said clamping means being rotatable about a pivot axis parallel to said longitudinal axis between a first position wherein said elongated member is secured against movement relative to said clamping means and a second position wherein said elongated member is released for movement relative to said clamping means, whereby movement of said clamping means between said first and second positions permits manual repositioning of the guide rail relative to the transport means without the use of tools.

2. The guide rail support set forth in claim 1 wherein said holding means includes said elongated member, and wherein said elongated member is received on said support means for longitudinal sliding movement, said clamping means including means for engaging said elongated member to lock said elongated member against longitudinal movement when said clamping means is in said first position and for disengaging said elongated member upon movement of said clamping means to said second position.

3. The guide rail support set forth in claim 1 wherein said elongated member includes a plurality of spaced position markers for indicating the position of said guide rail holding means relative to said support means.

4. The guide rail support set forth in claim 1 wherein said clamping means comprises a cam member operable upon movement to said first position to wedge said elongated member against longitudinal movement and freeing said elongated member for movement upon movement to said second position.

5. The guide rail support set forth in claim 4 wherein said cam member is mounted on said support for pivotal movement about said pivot axis, said cam member having an opening therein which is eccentric relative to said pivot axis, said support means having an opening formed therein for receiving said elongated member, said elongated member extending through said openings in said support means and said cam member, the axis of said opening in said support means being coaxial with said pivot axis.

6. The guide rail support set forth in claim 5 wherein said cam member has a round portion defined by opposed planar surfaces, said opening in said cam member extending between said surfaces, said support means including spaced apart support surfaces defining a space for receiving said round portion, said opening in said support means comprising coaxial openings formed in said support surfaces, said support surfaces supporting said cam member for pivotal movement about said pivot axis.

7. The guide rail support set forth in claim 6 and including a handle formed on said cam member and extending outwardly from between said support plates so that said cam member can be pivoted.

8. The guide rail support set forth in claim 7, wherein said elongated member includes a plurality of spaced position markers for indicating the position of said guide rail holding means relative to said support means.

9. The guide rail support set forth in claim 6 and including a second cam formed on one of the opposite surfaces of said cam member for engaging one of said support plates upon pivotal movement of said cam member from said second to said first position for imparting a camming force parallel to said longitudinal axis.

10. The guide rail support assembly set forth in claim 1 and including means mounted on one end of said elongated member for releasably supporting a guide rail for movement in a lateral direction relative to said longitudinal axis.

11. The guide rail support set forth in claim 10 wherein said elongated member includes a plurality of spaced position markers for indicating the position of said guide rail holding means relative to said support means.

12. A guide rail support assembly for use with a conveyor having transport means for transporting articles from one location to another, said guide rail support comprising the combination of guide rail holding means for holding a guide rail adjacent the transport means of a conveyor, and support means for supporting the guide rail holding means, said guide rail holding means being movable relative to the support means, said support means being constructed and arranged to be mounted on a conveyor and adjacent the transport means, a cam means mounted on one of the holding means and support means, said cam means having a first position for securing the holding means against movement relative to said support means and a second position wherein the cam means is released for movement relative to the support means, whereby movement of the cam means between its first and second positions permits rapid repositioning of the guide rail relative to the transport means of a conveyor without the use of tools, said holding means including a member received on said support means for movement relative thereto, said cam means including means for engaging said member to lock said member against movement when the cam means is in its first position and which disengages from said member upon movement of the cam means to its second position, said support means having a first opening formed therein for receiving said member, said cam means being mounted on said support for pivotal movement about an axis parallel to the axis of the first opening, said cam means having a second opening formed therein which is eccentric relative to the pivot axis, and said cam member comprising a round portion defined by opposed planar surfaces, the opening in said cam member extending between said surfaces, said support including spaced apart support surfaces for defining a space for receiving the round portion of said cam member, said first opening comprising coaxial openings in said support surfaces for receiving said member, said support surfaces supporting said cam member for pivotal movement about the pivot axis.

13. The guide rail support set forth in claim 12 and including a second cam formed on one of the opposite surfaces of said cam member for engaging one of said support surfaces upon pivotal movement of said cam member from its second to its first position for imparting a camming force perpendicular to the axis of the support surfaces.

14. The guide rail support set forth in claim 13 and including a handle formed on said cam member and extending outwardly from between said support surfaces so that said cam member can be pivoted.

15. The guide rail support assembly set forth in claim 12 and including boss means extending from at least one of said support surfaces, and a recess formed in at least one of the planar surfaces, said boss means and said recess having complementary engageble arcuate portions whose centers of curvature are coaxial with the axis of said openings in the support surfaces.

16. A guide rail support for use with a conveyor having transport means for transporting articles from one location to another, said guide rail support comprising:

a fixed member mounted on the conveyor adjacent the transport means, and including first and second support members, the first support member defining a first aperture having a first axis, and the second support member defining a second aperture having a second axis that is collinear with the first axis;

a cam member disposed between said first and second support members for rotation about a pivot axis that is collinear with said first and second axes, said cam member defining a cam aperture which is eccentric relative to said pivot axis; and a guide rail holding member adapted to hold a guide rail and having an elongated portion passing through said first and second apertures and through said cam aperture; whereby rotation of said cam member about said pivot axis causes said cam member to selectively restrain and permit movement of said guide rail holding member with respect to said cam member.

\* \* \* \* \*